United States Patent
Tsishkou et al.

(10) Patent No.: US 10,663,594 B2
(45) Date of Patent: May 26, 2020

(54) PROCESSING METHOD OF A 3D POINT CLOUD

(71) Applicant: IMRA EUROPE S.A.S., Sophia Antipolis (FR)

(72) Inventors: Dzmitry Tsishkou, Juan les Pins (FR); Frédéric Abad, Vallauris (FR); Rémy Bendahan, Juan les Pins (FR)

(73) Assignee: IMRA EUROPE S.A.S., Sophia-Antipolis (FR)

( * ) Notice: Subject to any disclaimer, the term of this patent is extended or adjusted under 35 U.S.C. 154(b) by 71 days.

(21) Appl. No.: 16/085,341

(22) PCT Filed: Mar. 14, 2017

(86) PCT No.: PCT/EP2017/056039
§ 371 (c)(1),
(2) Date: Sep. 14, 2018

(87) PCT Pub. No.: WO2017/157967
PCT Pub. Date: Sep. 21, 2017

(65) Prior Publication Data
US 2019/0086546 A1    Mar. 21, 2019

(30) Foreign Application Priority Data

Mar. 14, 2016   (DE) .................. 10 2016 204 177

(51) Int. Cl.
*G01S 17/89*       (2020.01)
*G06K 9/00*        (2006.01)
(Continued)

(52) U.S. Cl.
CPC ............ *G01S 17/89* (2013.01); *G01S 7/4802* (2013.01); *G01S 7/4808* (2013.01);
(Continued)

(58) Field of Classification Search
CPC ....... G06T 7/521; G01S 17/89; G01S 17/931; G01S 7/4802; G01S 7/4808;
(Continued)

(56) References Cited

U.S. PATENT DOCUMENTS 8,340,400 B2 * 12/2012 Lukas ................ G06K 9/00201
                                                                382/154
8,442,304 B2 *  5/2013 Marrion ............ G06K 9/00214
                                                                382/154

OTHER PUBLICATIONS

Andres Serna et al., Detection, segmentation and classification of 3D urban objects using mathematical morphology and supervised learning, Jul. 2014, ISPRS Journal of Photogrammetry and Remote Sensing. (Year: 2014).*

(Continued)

*Primary Examiner* — Wednel Cadeau
(74) *Attorney, Agent, or Firm* — Kenealy Vaidya LLP (57) ABSTRACT

Some embodiments are directed to a processing method of a three-dimensional point cloud, including: obtaining a 3D point cloud from a predetermined view point of a depth sensor; extracting 3D coordinates and intensity data from each point of the 3D point cloud with respect to the view point; transforming 3D coordinates and intensity data into at least three two-dimensional spaces, namely an intensity 2D space function of the intensity data of each point, a height 2D space function of an elevation data of each point, and a distance 2D space function of a distance data between each point of 3D point cloud and the view point, defining a single multi-channel 2D space.

20 Claims, 5 Drawing Sheets

(51) Int. Cl.
*G06K 9/42* (2006.01)
*G01S 7/48* (2006.01)
*G06K 9/62* (2006.01)
*G01S 17/931* (2020.01)
*G06T 7/521* (2017.01)
*G05D 1/00* (2006.01)

(52) U.S. Cl.
CPC .......... *G01S 17/931* (2020.01); *G05D 1/0088* (2013.01); *G06K 9/00201* (2013.01); *G06K 9/00805* (2013.01); *G06K 9/42* (2013.01); *G06K 9/627* (2013.01); *G06T 7/521* (2017.01); *G06T 2207/10028* (2013.01); *G06T 2207/20081* (2013.01)

(58) Field of Classification Search
CPC ............. G05D 1/0088; G06K 9/00201; G06K 9/00805; G06K 9/42; G06K 9/627
USPC ......................................................... 382/154
See application file for complete search history.

(56) References Cited

OTHER PUBLICATIONS

Serna, A., et al., "Detection Segmentation and Classification of 3D Urban Obkects Using Mathematical Morphology and Supervised Learning," ISPRS Journal of Photogrammetry and Remote Sensing 2014;93:243-255.

Socher, R., et al., "Convolutional-Recursive Deep Learning for 3D Object Classification," Jan. 1, 2012, XP055377429, Retrieved from Internet: URL:https://papers.nips.cc/paper/4773-convolutional-recursive-deep-learning-for-3d-object-classification.pdf, [retrieved on May 31, 2017], pp. 1-9.

Bo, L., et al., "Unsupervised Feature Learning for RGB-D Based Object Recognition," In: Springer tracts in advanced robotics, Jan. 1, 2013, vol. 88, pp. 387-402.

International Search Report and Written Opinion for PCT Patent App. No. PCT/EP2017/056039 (dated Jun. 27, 2017).

* cited by examiner

PROCESSING METHOD OF A 3D POINT CLOUD

CROSS REFERENCE TO RELATED APPLICATIONS

This application is a national phase filing under 35 C.F.R. § 371 of and claims priority to PCT Patent Application No. PCT/EP2017/056039, filed on Mar. 14, 2017, which claims the priority benefit under 35 U.S.C. § 119 of German Patent Application No. 10 2016 204 177.0, filed on Mar. 14, 2016, the contents of each of which are hereby incorporated in their entireties by reference.

BACKGROUND

Some embodiments of the presently disclosed subject matter relate to automated driving of vehicles. In particular, some embodiments relate to a processing method of a three-dimensional (3D) point cloud derived using a Lidar or the like. Some embodiments further relate to a method for classification of an object of interest within a 3D point cloud based on such processing method and using machine learning.

The methods of some embodiments are useful especially in the field of human-assisted or autonomous vehicles using a depth sensor such as a Lidar sensor for obstacle detection and avoidance to navigate safely through environments. A Lidar sensor measures distance by illuminating a target with a laser light.

A related art publication, "Convolutional-Recursive Deep learning for 3D object classification", Richard Socher, Brody Huval, Bharath Bhat, Christopher D. Manning, Andrew Y. Ng, NIPS 2012, describes a method for 3D object classification using convolution-recursive deep learning. Input to the classification system needs RGB-D information, which is composed of RGB (red, green, blue) data from camera and D (distance) from depth sensor (STEREO, TOF, LIDAR, etc.). Such a method presents several drawbacks among which the use of several sensors, namely a camera and a depth sensor, and the need of integrating together data from the camera (image) with the depth sensor (coordinates) for feeding the deep learning.

Another related art publication, "Towards 3D object recognition via classification of arbitrary object tracks", Alex Teichman, Jesse Levinson, and Sebastian Thrun (ICRA 2011), describes a method of object recognition. In the described method, each source of data is used to compute hand-crafted features in sequential manner, followed by machine learning classification in series of cascades. This processing flow is optimized to solve mostly generic highly repetitive cases, but which reveals to have poor performance in less generic situations due to limited flexibility in parameter tuning that cannot be optimal for all situations at the same time. Finally, only intensity data is presented in form of 2D image maps, which limits parallel access and processing to single source of information.

Another related art European patent publication, EP 2 958 049 A2 describes a method of extracting feature regions from point cloud. The described method uses hand-crafted process for key point selection and descriptor computation for corresponding voxel, which is later classified by machine learning algorithm. Such a processing pipeline, where features are pre-selected, could not let Deep Neural Network (DNN) to realize its potential in automatically finding features since significant part of the information was pre-filtered due to the choice of hand-crafted methods. Such pre-filtering could be beneficial for certain types of situations, while penalizing in many other real world situations. Further the described method does not compensate for low density of point cloud data, therefore having lower recognition accuracy for objects at far distance.

Another related art publication, "Obstacle Classification and 3D Measurement in Unstructured Environments Based on ToF Cameras" by Yu et al., describes an obstacle detection and classification method based on the use of Time-of-Flight (ToF) cameras for robotic navigation in unstructured environments. While using different kind of sensors (TOF vs. Lidar), intensity measurement is performed using a SR-3000 sensor controlled as a so-called 1-tap sensor. This means that in order to obtain reliable distance information, four consecutive exposures have to be performed. Fast moving targets in the scene may therefore cause errors in the distance calculation. According to the system parameters defined in the manual of the SR-3000 sensor (aiweb.techfak.uni-bielefeld.degiles/SR3000_manual_V1.03.pdf), the described method uses intensity up to 7.5 m at 850 nm wavelength. Further, the described method is based on a feature engineering approach, where all features are hand-crafted so that the way how data is combined remained unchangeable independently of training data. It never or rarely uses combination of intensity and 3D information to form features for object recognition, but uses instead either 3D data or either 2D data processing consequently, while by having direct correspondence between intensity value and 3D measurement for each pixel. Furthermore, the described method uses intensity to filter noise during segmentation of regions of interest to improve 3D obstacle clustering. More particularly, the described method uses 4 separate channels I, X, Y, Z, which forms several spaces and cannot be processed easily and efficiently by convolution deep neural networks without additional processing stage.

These related art publications address the problem of object classification by combination of data from multiple sensors and/or hand-crafted processes of feature selection, which gives acceptable results in common everyday situations. However, combination of sensors practically limits the conditions of use to situations where all used sensors could efficiently capture signal (e.g. day, good weather conditions, etc.) and fail to deliver accurate results in situations where one of the sensors cannot resolve the captured signal (e.g. camera at night, rainy conditions, etc.). Further, hand-crafted feature selection process could only be tuned to achieve maximum performance to very few typical situations (e.g. most common ones), while in others (rare/unique) cases it cannot achieve the same performance due to absence of hand-crafted features needed for robust classification.

SUMMARY

Some embodiments of presently disclosed subject matter therefore address or overcome the above mentioned drawbacks of the related art, and to propose first a processing method of a 3D point cloud which is simple and adapted for machine learning purposes and a method of classification of an object of interest within a 3D point cloud based on such processing method and using machine learning.

Some embodiments therefore relate to a processing method of a three-dimensional (3D) point cloud, including:
  obtaining a 3D point cloud from a predetermined view point of a depth sensor;
  extracting 3D coordinates (xyz) and intensity (i) data from each point of the 3D point cloud with respect to the view point;

transforming 3D coordinates (xyz) and intensity (i) data into at least three two-dimensional (2D) spaces:
- an intensity 2D space (IS) function of the intensity (i) data of each point;
- a height 2D space (HS) function of an elevation (h) data of each point, and
- a distance 2D space (DS) function of a distance (d) data between each point of 3D point cloud and the view point, defining a single multi-channel 2D space (IS, HS, DS).

The processing method according to some embodiments provide a simple and easy way to transform the obtained 3D point cloud data into a single multi-channel 2D space defined by at least three 2D spaces including information on the intensity, the elevation and distance which allows to keep all essential information in order to recognize any object of interest within the 3D point cloud. Further, having an intensity space from the depth sensor intensity data, brings additional source of information useful to classify objects made from different materials. Furthermore, such single multi-channel 2D space is well adapted to machine learning algorithm and only needs to use a single depth sensor which is at lower cost compared to fusion of sensors and produces (time series of point clouds with 3D coordinates and intensity data with the same signal/noise ratio for all day/night and weather conditions. Thus, by defining a single multi-channel 2D space (IS, HS, DS) corresponding to a single combined image space, it greatly increases ability of deep or convolutional neural network (DNN or CNN) to automatically determine the best combination of filters/features along of a depth column of 3 types of information (intensity, height, depth) for all layers simultaneously.

Advantageously or preferably, the transforming step further includes the steps of detecting background points and setting a predetermined default value for detected background points. Background points which are detected thanks to their coordinates and intensity values, are set to a fixed value (e.g. 0, 0, 0) within the different 2D spaces. Therefore, foreground points (non-background) which are also transformed into 2D spaces would then not occupy them entirely. Indeed in the resulting 2D spaces, background points would be empty. Advantageously or preferably, the chosen default value should be different from values of points projected into 2D spaces for each space/channel. We experimented with different values and find out that the fixed default value (0,0,0) provides highest resulting accuracy. Furthermore, machine learning would then be able to use background/foreground information to learn outside shape or contours of objects of interest.

Advantageously or preferably, the processing method includes a training phase during which it further comprises before the transforming step, the steps of:
- supplying tags data (Label-A) classifying objects in 1:N classes; and
- labelling each extracted point data (xyzi) as belonging to objects of 1:N classes according to the supplied tags data (Label-A).

Such labelling step ensures that during the training phase, objects of interest within the 3D point cloud are correctly assigned to the corresponding tags. It also shortens such training phase and increases reliability of classification during online phase.

Advantageously or preferably, the transforming step includes a normalizing step of at least one of the 2D spaces, which includes:

- normalizing the intensity space (IS) by applying an intensity normalizing function depending on the distance data to the intensity data of each point; and/or
- normalizing the height space (HS) by applying a height normalizing function depending on the minimum and maximum elevation data within the 3D point cloud to the elevation data of each point; and/or
- normalizing the distance space (DS) by applying a distance normalizing function depending on the minimum and maximum distance data within the 3D point cloud to the distance data of each point, defining a normalized single multi-channel 2D space (ISN, HSN, DSN).

Such normalization renders uniform the data and enhances machine learning focus on finding generic patterns. Indeed, having a normalizing step by mixing absolute (unique) and relative (generic) data channels together has proven to be a validated trade-off between unique and generic cases within the 3D point cloud.

Advantageously or preferably, the 3D point cloud is derived using a depth sensor such as a Lidar. Using a single depth sensor such as a Lidar to define the single multi-channel 2D space proves to be more economical and easy to integrate in particular as regards the produced data format.

Advantageously or preferably, each of the intensity space, the height space and the distance space is respectively assigned to one of RGB (red, green, blue) value spaces for each point. Using the RGB value spaces to assign instead the intensity, height and distance spaces defining the single multi-channel 2D space allows a perfect data match with machine learning algorithm already designed to receive such RGB value spaces without needing any format modification. Thus, RGB value spaces are designed to be directly compatible with RGB image processing chain usually provided at the entry of machine learning algorithm.

Some other embodiments related to a method for classification of an object of interest within a 3D point cloud, including:
- the processing method according to any of the first aspect method variants;
- supplying at least one single multi-channel 2D space (IS, HS, DS; ISN, HSN, DSN) to a machine learning such a deep neural network;
- outputting at least one classification label for each single multi-channel 2D space supplied identifying at least one object of interest within the 3D point cloud.

The classification method of some embodiments provide a method that merges at least three different sources of information, namely intensity, height and distance together in the form of merged (normalized) 2D spaces defining a (normalized) single multi-channel 2D space which is a very efficient way to communicate this information for any machine learning. Indeed, single multi-channel 2D space can be used as entry for parallel processing chain of machine learning such as convolution or deep neural networks. With parallel access and processing of such merged 2D spaces, i.e. (normalized) single multi-channel 2D space, by the machine learning, it could automatically construct feature/decision space, which maximizes classification performance in much wider set of situations due to its ability to find more stable patterns, especially related to combination of intensity, height and distance information which is hard to be hand-crafted by humans. Therefore by designing a single multi-channel space, it extends depth of the input layer by a factor of 3, giving ability of CNN/DNN to learn the best combination of filters/features. It also speeds up reaction time which is important both during the training phase in order to be able to digest as much as possible data and also during the online phase (e.g. in driving conditions) in order to be able to recognize any potential danger as quickly as possible.

Advantageously or preferably, during a training phase of the machine learning, the supplying step includes:

accumulating a batch of multi-channel 2D spaces by repeating the processing method according to any of the first aspect method variants;

and one or more of the following variants:

supplying an average combination of a random number of multi-channel 2D spaces among the batch of accumulated multi-channel 2D spaces;

supplying several multi-channel 2D spaces distributed in a predefined order among the batch of accumulated multi-channel 2D spaces;

supplying a matrix of at least 2×2 multi-channel 2D spaces randomly selected among the batch of accumulated multi-channel 2D spaces.

Such supplying variants using time series of data (accumulated batch) combined into one or several multi-channel 2D spaces is useful during the training stage in particular to compensate for low density of data at far distances and therefore allowing DNN to access more information and select more robust features/patterns resulting in a higher recognition accuracy for objects at far distance compared to related art methods which does not compensate for low density of point cloud data.

While it is also possible to supply the DNN with such combination of multi-channel 2D spaces during online stage, it is advantageous or preferable to supply only a single multi-channel 2D space to get faster processing and output. Furthermore, a trained DNN benefits from the training phase to be able to accurately recognize stable patterns even if it receives low density of point data.

Some embodiments further relate to a vehicle, comprising:

a depth sensor configured to obtain 3D point clouds of a followed path when the vehicle is driven at least from a driver's point of view, a processing unit to process the obtained 3D point clouds according to the first aspect embodiment;

a classifying unit to classify an object of interest within processed 3D point clouds according to the second embodiment;

a display unit configured to display an information related to the classified object of interest;

an autonomous driving unit configured to control the vehicle depending on the classified object of interest; and a decision unit to decide to activate at least one of the display unit and the autonomous driving unit.

BRIEF DESCRIPTION OF THE FIGURES

Other features and advantages of some embodiments will appear more clearly from the following detailed description of particular non-limitative examples of some embodiments, illustrated by the appended drawings where.

DETAILED DESCRIPTION OF EXEMPLARY EMBODIMENTS

The methods according to some embodiments include a processing method to transform a three-dimensional (3D) point cloud obtained by a depth sensor (e.g. Lidar) into one single or several multi-channel 2D spaces and according to a second aspect a method for classification of an object of interest within a 3D point cloud using machine learning (e.g. deep neural network) supplied by one or more multi-channel 2D spaces obtained by the processing method. This method of classification comprises a learning phase during which a deep neural network (DNN) learns all possible useful patterns to classify and recognize object of interest within a 3D point cloud based on as much as possible data supplied in the format of multi-channel 2D spaces and an online phase during which the DNN classifies object of interests recognized within 3D point cloud data supplied in the form of a single multi-channel 2D spaces.

The methods of some embodiments are useful especially in the field of human-assisted or autonomous vehicles using a depth sensor such as a Lidar sensor for obstacle detection and avoidance to navigate safely through environments. 3D point cloud outputs from the Lidar sensor provides the desired data for a robot software including both of these methods to promptly and accurately determine where potential obstacles exist in the environment.

Figure 1:
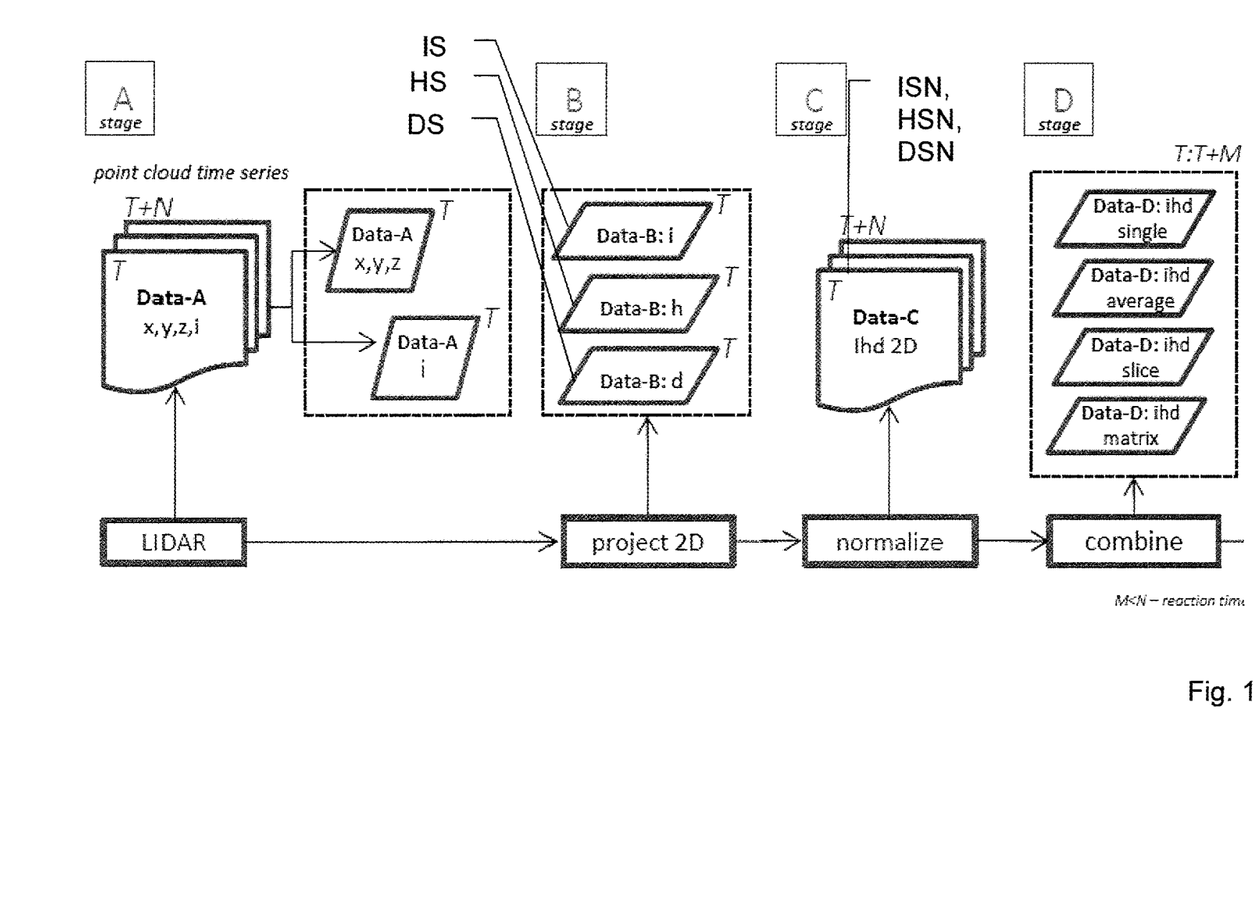
FIG. 1 represents a processing method of a 3D point cloud according a advantageous or preferred embodiment.

According to an advantageous or preferred processing method of a 3D point cloud illustrated on FIG. 1, the processing method of some embodiments include four stages A to D. Stage A is an acquisition stage of 3D point cloud data using a depth sensor such as a Lidar. Stage B is a projection stage also called transformation stage where 3D point cloud data are projected or transformed into several 2D spaces. Stage C is an optional stage where the 2D spaces obtained at stage B are normalized to get uniform data. Depending on whether the processing method is used during a training phase or online phase in relation with the classification method, stage D defines and combines several kinds of multi-channel 2D spaces to be further supplied to a machine learning.

In Stage A, the depth sensor used is advantageously or preferably a Lidar sensor of the scanning laser range finder kind.

This Lidar sensor scans its environment with a laser beam and measures for each point scanned its distance from the Lidar sensor view point as well as its intensity, allowing the reconstruction of a three-dimensional model of the scene in the form of a 3D point cloud (Data-A) at time T comprising 3D coordinates (xyz) and intensity data (i) for each point of the cloud with respect to the view point of the Lidar sensor.

An example of Lidar sensor that can be used is the Velodyne lidar sensor HDL-64E (velodynelidar.com/docs/datasheet/63-9194 Rev-D_HDL-64E_Data%20Sheet_Web.pdf). This Lidar sensor uses 64 fixed-mounted lasers to measure the surrounding environment, each mechanically mounted to a specific vertical angle, with the entire unit spinning. This approach dramatically increases reliability, field of view (FOV), and point cloud density. The capture frequency of 3D point cloud is advantageously or preferably between 10 and 15 Hz allowing to capture point cloud time series up to 120 m at 905 nm wavelength.

Advantageously or preferably, during training phases, tags data (Label-A) classifying objects in 1:N classes is supplied so that obtained 3D point cloud data (Data-A) are tagged as belonging to objects of 1:N classes based on supplied tags data (Label-A).

Stage A output corresponds to tagged point could data (Data-A and Label-A) being decomposed into 3D coordinates relative to the view point and intensity value for each point.

In Stage B, (tagged) 3D point cloud data (Data-A) is inputted. At a time T, 3D coordinates (xyz) and intensity (i) data are projected into three different 2D image spaces, namely an intensity 2D space (IS), a height 2D space (HS) and a distance 2D space (DS).

For transforming 3D coordinates into 2D spaces, several methods can be used such as a projection matrix 3D to 2D defined to reproduced a 2D image corresponding to the view point of the Lidar sensor. For example, we can use a transformation matrix of the perspective projection type (en.wikipedia.org/wiki/Transformation_matrix#Perspective_projection). We can also use a transformation matrix by applying a 3D rotation (e.g. with respect to axis y) in order to obtain a canonical view or do rotation multiple times with different values of angle as a form of data augmentation before a projection on a 2D space so that the deep neural network would be more accurate recognizing novel views.

The intensity 2D space (IS) is defined as a function of the intensity (i) data of each point within the 3D point cloud. Such function can be very simple as for example a direct transposition of the intensity data into the 2D space or more complex depending also on the distance data.

The height 2D space (HS) is defined herewith as a function of an elevation data (h) linked to the z coordinate of each point with respect to the view point.

The distance 2D space (DS) is defined as a function of the distance (d) data between each point and the view point linked to the xyz coordinates. Such distance space aims to only reflect points from the point cloud that can be seen from the view point. One simple absolute function can be for example the following:

$$d=\operatorname{sqrt}(x\char`\^2+y\char`\^2+z\char`\^2).$$

Advantageously or preferably background points, which are detected thanks to their distance and intensity values, are set to a fixed value (zero) within the different 2D spaces in order to be excluded from the machine learning.

Stage B output corresponds to three 2D spaces including an intensity, height and distance 2D spaces (Data-B) defining a single multi-channel 2D space.

In Stage C, the three 2D spaces (Data-B) are inputted. This stage is used to normalize all 2D spaces and renders uniform data. This normalization is done according to min and max values or any other adequate complex function, so that data represents relative changes of intensity, height and distance within point cloud at time T.

The normalized intensity 2D space (ISN) is obtained by applying an intensity normalizing function depending on the distance data to the intensity data of each point. An example of complex function is the normalization of intensity as function of the distance of the object as given in Velodyne user's manual and programming guide HDL-64E S3 "High Definition LiDAR Sensor" (see p. 45).
 velodynelidar.com/docs/manuals/63-HDL64ES3g %20USERS%20MANUAL_PROGRAM%20GUIDE, %20HDL-64E%20S3.pdf)

The normalized height 2D space (HSN) is obtained by applying a height normalizing function depending on the minimum and maximum elevation data within the 3D point cloud to the elevation data of each point. An example of height normalizing function for each point of the point cloud can be as follows:

$$\text{height.pixel.value}=255*((z-\text{min\_pt}.z)/(\text{max\_pt}.z-\text{min\_pt}.z));$$

where min_pt.z and max_pt.z correspond to the minimum and maximum heights within the 3D point cloud at given time T.

The normalized distance 2D space (DSN) is obtained by applying a distance normalizing function depending on the minimum and maximum distance data within the 3D point cloud to the distance data of each point.

An example of distance normalizing function for each point of the point cloud can be as follows:

$$\text{distance.pixel.value}=255*((d-\text{min\_pt}.d)/(\text{max\_pt}.d-\text{min\_pt}.d));$$

where min_pt.d and max_pt.d correspond to the minimum and maximum distance values within the 3D point cloud at given time T.

For complex functions of distance or height normalization, we can consider using the above-mentioned formulas but with a weight [a, b] that depends on the distance between the view point (i.e. Lidar sensor) and the detected objects within the point cloud. We can set for example a weight close to [b] for far objects and close to [a] for closer objects where [a]>[b]. The values of [a] and [b] would advantageously or preferably be defined experimentally to optimize the classification of objects at each target distance.

$$\text{height.pixel.value}=\text{weight}(\text{distance})*255*((z-\text{min\_pt}.z)/(\text{max\_pt}.z-\text{min\_pt}.z));$$

$$\text{distance.pixel.value}=\text{weight}(\text{distance})*255*((d-\text{min\_pt}.d)/(\text{max\_pt}.d-\text{min\_pt}.d));$$

Stage C output corresponds to normalized three 2D spaces (Data-C) defining a single normalized multi-channel 2D space.

In Stage D, the normalized three 2D spaces (Data-C) are inputted. Depending on whether the processing method is used during a training phase or online phase, stage D defines and combines several kinds of (normalized) multi-channel 2D spaces (Data-D) to be further supplied to a machine learning as it will be explained in relation with FIG. 2. Several examples of multi-channel 2D spaces will be presented in more details with FIGS. 3A-3D.

Figure 2:
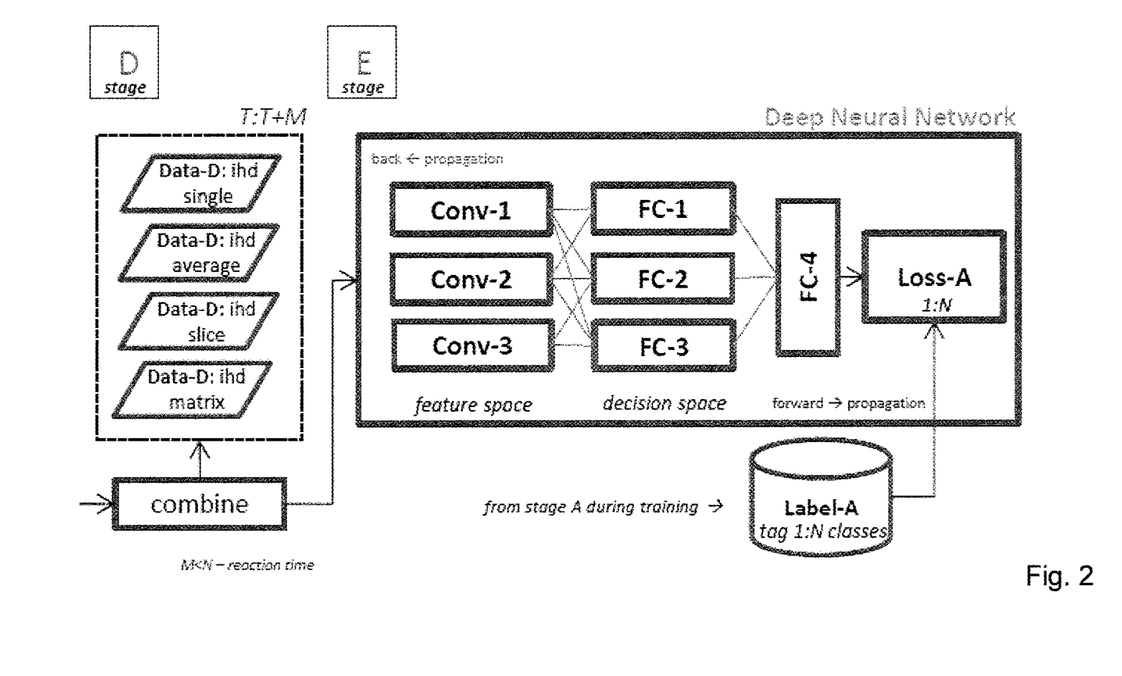
FIG. 2 represents a method for classification of an object of interest within a 3D point cloud according to the second embodiment.

FIGS. 3A-3D illustrate four examples of data combination outputted from Stage D to be supplied to the machine learning (Stage E, FIG. 2). Each figure shows an original time sequence of nine consecutive single multi-channel 2D spaces (ihd) corresponding to an accumulated batch of data inputted to Stage D (Data-C). Each 2D space is an array of 64×64 pixels, so that each single multi-channel 2D space (ihd) is an array of 64×64×3.

Figure 3A:
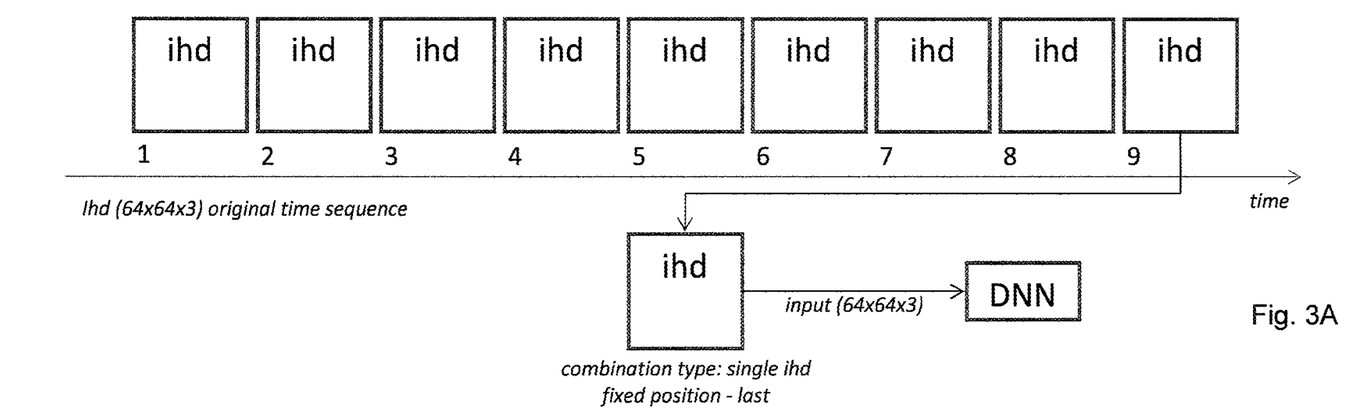
FIGS. 3A-3D represents four variants of multi-channel 2D spaces.

In the first example of FIG. 3A, Stage D output (Data-D) corresponds to the last single multi-channel 2D space (ihd 9). Such a straight selection of the last single fixed position is advantageously or preferably used during online phases when responsiveness from the machine learning is needed. Data-D format is the same as a single multi-channel 2D space, that is to say 64×64×3.

Figure 3B:
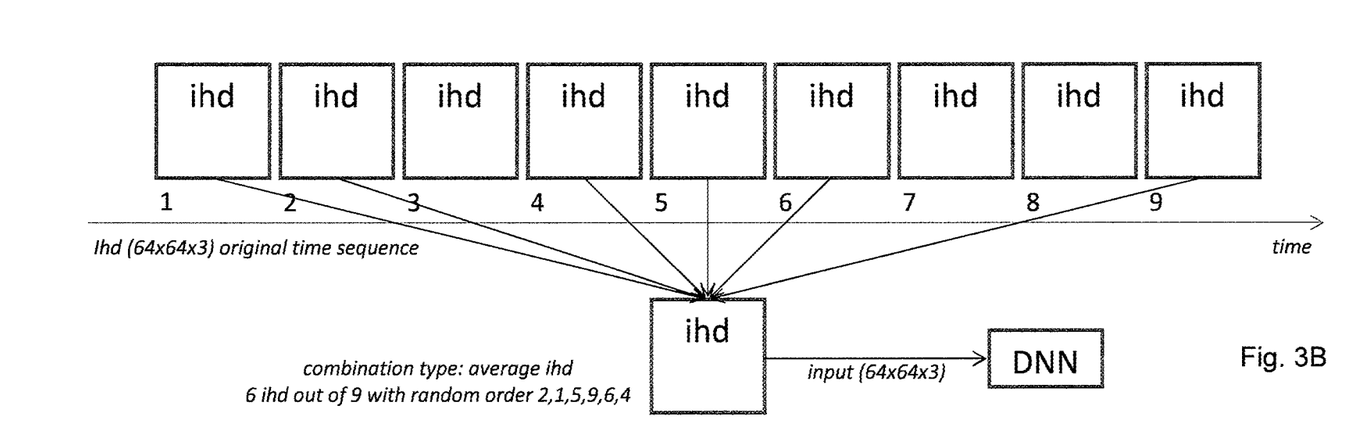

In the second example of FIG. 3B, Stage D output corresponds to an average combination of a random number of multi-channel 2D spaces among the original time sequence. Such an average combination is advantageously or preferably used during training phases of the machine learning in order to supply data based on more information (ihd 1-9). In the illustrated example, 6 out of 9 multi-channel 2D space are randomly selected (e.g. 2, 1, 5, 9, 6, 4). Data-D format is the same as a single multi-channel 2D space, that is to say 64×64×3.

Figure 3C:
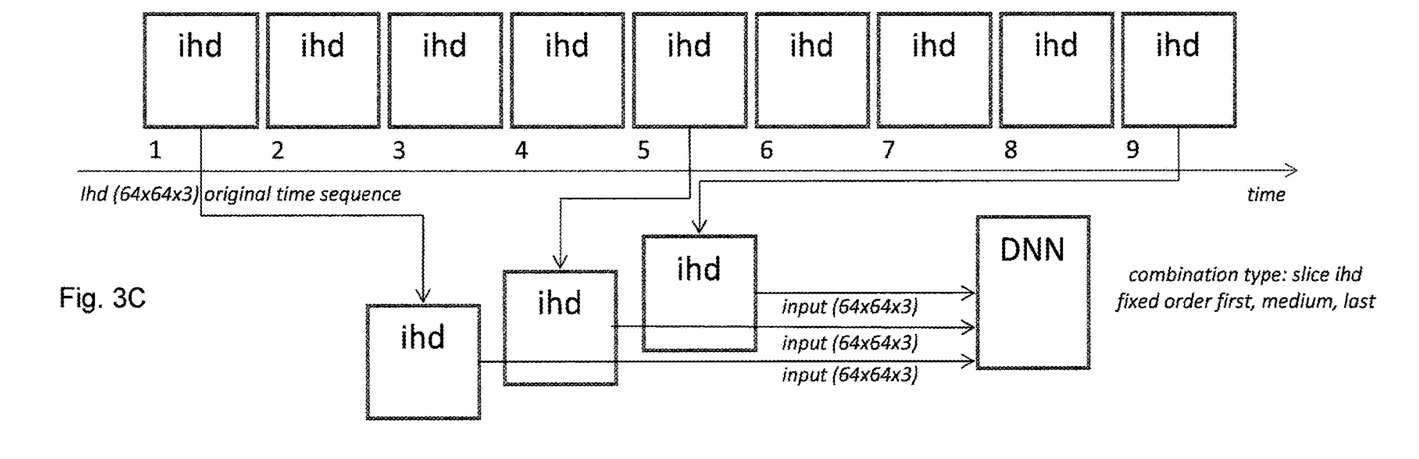

In the third example of FIG. 3C, Stage D output corresponds to several multi-channel 2D spaces (ihd slices) distributed in a predefined order among the original time sequence. Such a slice combination is also advantageously or preferably used during training phases of the machine learning in order to supply more data (3 ihds) based on more information (ihd 1-9). In the illustrated example, first (ihd 1), medium (ihd 5) and last (ihd 9) multi-channel 2D space are selected. Data-D format is three times 64×64×3.

Figure 3D:
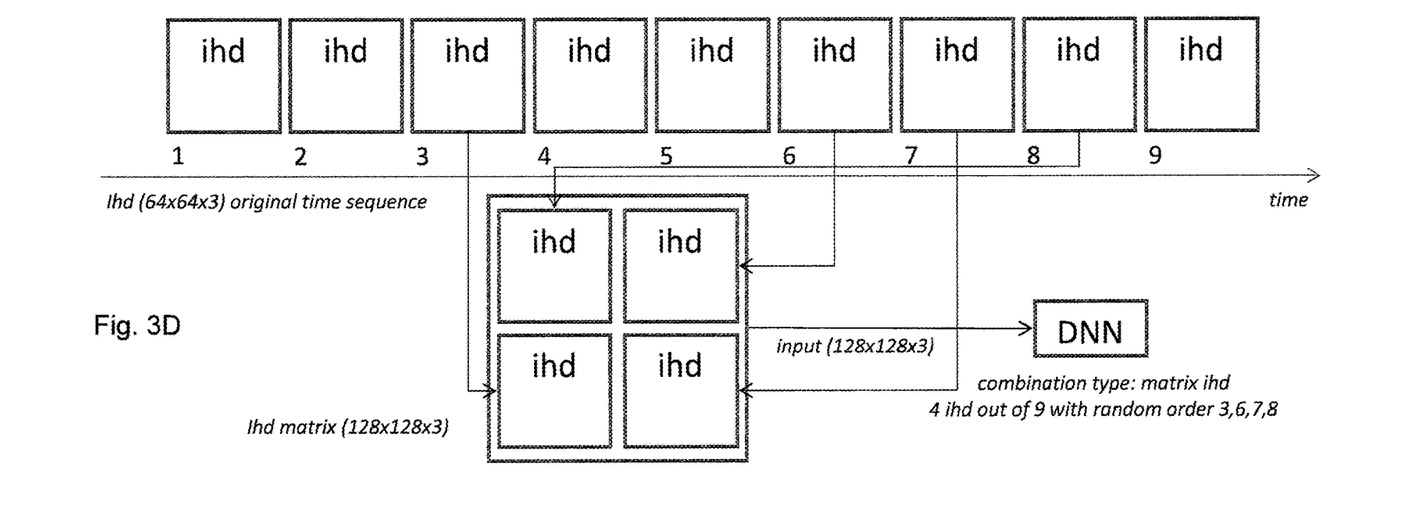
Figure 4:
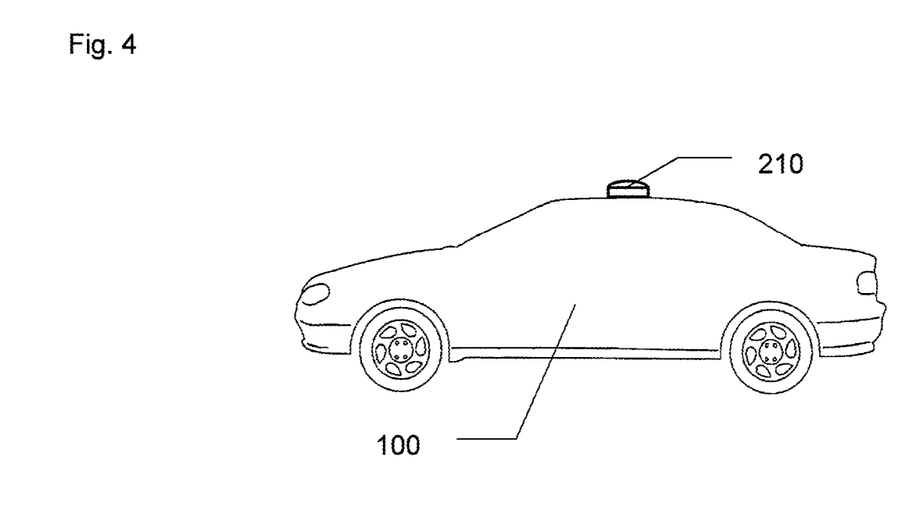
FIG. 4 represents a vehicle equipped with the desired units to implement the methods according to some embodiments.

In the fourth example of FIG. 3D, Stage D output corresponds to a matrix of at least 2×2 multi-channel 2D spaces randomly selected among the original time sequence. Such a matrix combination is also advantageous or preferably used during training phases of the machine learning in order to supply more data (4 ihds) based on more information (ihd 1-9). In the illustrated example, four ihds (ihd 3, 6, 7, 8) out of 9 are randomly selected. Data-D format is 128×128×3.

These last three examples provide the possibility to increase the data supplied to the deep neural network, without recording too many images upfront.

FIG. 2 illustrates an advantageous or preferred method for classification of an object of interest within a 3D point cloud based on the processing method presented in relation with FIG. 1.

Following stages A-D presented in FIG. 1, Data-D is outputted to a machine learning, advantageously or preferably a Deep Neural Network (DNN) at Stage E. The defined configuration of DNN could be one of several categories: network in network, convolutional, recurrent, etc.

Advantageously or preferably, the used DNN can be a convolutional neural network, and more particularly, this convolutional neural network might be Inception V3, presented by Christian Szegedy, Vincent Vanhoucke, Sergey Ioffe, Jonathon Shlens, and Zbigniew Wojna at the following address: arxiv.org/pdf/1512.00567v3.pdf. Such deep neural networks are well suited to analyse bi-dimensional objects such as multi-channel 2D spaces.

In Stage E, any kind of Data-D presented in FIG. 3A-3D is inputted. During the training phase, Label-A data is also inputted.

A first step includes or consists of connecting one or multiple multi-channel 2D spaces (Data-D) to one or multiple inputs of DNN's feature spaces (Conv-1, Conv-2, Conv-3), depending on its configuration and target performance level requirements. During training phases, most accurate combination will be advantageously or preferably selected such as a time series of 2D spaces (e.g. FIG. 3C) connected to multiple feature spaces, while during online phases a fast combination such as a single multi-channel 2D spaces (e.g. FIG. 3A) will be connected to unique feature space. Alternatively, it is possible to add a tracking algorithm, so that as long the object of interest is tracked, we can switch between any of the accumulation methods in order to get refined data combinations and more confident classification level.

A second step includes or consists of training the DNN, where both feature and decision spaces shall be constructed via back-propagation of feedback generated by loss function (Loss-A) given forward signal from mini-batch of multi-channel 2D spaces with tags defined in Label-A (tags from each point cloud used to tag corresponding 2D spaces).

A third step includes or consists of propagating forward signal through DNN using online multi-channel 2D spaces (during online phases or combination of multi-channel 2D spaces (Data-during training spaces to get classification labels and estimated confidence level.

Stage E output corresponds to classification labels advantageously or preferably along with estimated confidence level for each point cloud or time series of point cloud acquired by the Lidar sensor.

The goal achieved by such classification method is to automatically find best features and construct decision space that maximizes probability of correct classification of 3D point cloud time series data acquired by the Lidar sensor that can be used for example for 3D object recognition.

FIG. 6 represents a vehicle 100 equipped with a 360° scanning unit 210, such as a laser light scanning unit (LIDAR) to take a continuous series of 3d point clouds during a journey. The vehicle 100 also comprises an electronic control unit, a display unit and an autonomous driving unit.

The electronic control unit comprises a processing unit to process the obtained 3D point clouds, a classifying unit to classify an object of interest within processed 3D point clouds and a decision unit to decide to activate at least one of the display unit and the autonomous driving unit.

For comparison, the applicants compared the current classification method with the results published in publication "Towards 3D object recognition via classification of arbitrary object tracks", of Alex Teichman, Jesse Levinson, and Sebastian Thrun (ICRA 2011).

The current classification method can reach similar level of performance on the test set proposed by Teichman et al.—that is to say 99.6% in pedestrian recognition accuracy. The advantage of the current method is that such a level of recognition is reached through a single shot (need only one Lidar frame). It does not need any additional algorithm such as tracking used in Teichman et al. which means that the response time is much faster. As an example, when using a 100 ms acquisition Lidar frame, the current method can reply within the next 100 ms whereas Teichman et al. may take more than 1 s. The long response time of Teichman et al. is of course limiting for automated driving and collision avoidance purposes.

It will be understood that various modifications and/or improvements evident to those of ordinary skill in the art can be brought to the different embodiments described in the present description without departing from the scope of some embodiments defined by the accompanying claims.

The invention claimed is:

1. A method of processing a three-dimensional point cloud, comprising:
   obtaining a 3D point cloud from a predetermined view point of a depth sensor;
   extracting 3D coordinates and intensity data from each point of the 3D point cloud with respect to the view point;
   transforming 3D coordinates and intensity data into at least three two-dimensional (2D) spaces, utilizing:
     an intensity 2D space function of the intensity data of each point;
     a height 2D space function of an elevation data of each point, and
     a distance 2D space function of a distance data between each point of 3D point cloud and the view point; and defining a single multi-channel 2D space based on the at least three two-dimensional (2D) spaces.

2. The method of processing method of claim 1, wherein the transforming step further includes:
   detecting background points; and
   setting a predetermined default value for detected background points.

3. The method of processing method of claim 1, further including a training phase that further includes before the transforming step:
   supplying tags data classifying objects in 1:N classes; and
   labelling each extracted point data as belonging to objects of 1:N classes according to the supplied tags data.

4. The method of processing method of claim 1, wherein the transforming step includes a normalizing step of at least one of the 2D spaces, which includes:
   normalizing the intensity space by applying an intensity normalizing function depending on the distance data to the intensity data of each point; and/or
   normalizing the height space by applying a height normalizing function depending on the minimum and maximum elevation data within the 3D point cloud to the elevation data of each point; and/or
   normalizing the distance space by applying a distance normalizing function depending on the minimum and maximum distance data within the 3D point cloud to the distance data of each point, and
   defining a normalized single multi-channel 2D space.

5. The method of processing method of claim 1, wherein the 3D point cloud is derived using the depth sensor such as a Lidar.

6. The method of processing method of claim 1, wherein each of the intensity space, the height space and the distance space are respectively assigned to one of RGB value spaces for each point.

7. The processing method of claim 2, further including a training phase that further includes before the transforming step:
   supplying tags data classifying objects in 1:N classes; and
   labelling each extracted point data as belonging to objects of 1:N classes according to the supplied tags data.

8. The processing method of claim 2, wherein the transforming step includes a normalizing step of at least one of the 2D spaces, which includes:
   normalizing the intensity space by applying an intensity normalizing function depending on the distance data to the intensity data of each point; and/or
   normalizing the height space by applying a height normalizing function depending on the minimum and maximum elevation data within the 3D point cloud to the elevation data of each point; and/or
   normalizing the distance space by applying a distance normalizing function depending on the minimum and maximum distance data within the 3D point cloud to the distance data of each point, and
   defining a normalized single multi-channel 2D space.

9. The processing method of claim 2, wherein the 3D point cloud is derived using the depth sensor such as a Lidar.

10. The processing method of claim 2, wherein each of the intensity space, the height space and the distance space are respectively assigned to one of RGB value spaces for each point.

11. The processing method of claim 3, wherein the transforming step includes a normalizing step of at least one of the 2D spaces, which includes:
    normalizing the intensity space by applying an intensity normalizing function depending on the distance data to the intensity data of each point; and/or
    normalizing the height space by applying a height normalizing function depending on the minimum and maximum elevation data within the 3D point cloud to the elevation data of each point; and/or
    normalizing the distance space by applying a distance normalizing function depending on the minimum and maximum distance data within the 3D point cloud to the distance data of each point, and
    defining a normalized single multi-channel 2D space.

12. The processing method of claim 3, wherein the 3D point cloud is derived using the depth sensor such as a Lidar.

13. The processing method of claim 3, wherein each of the intensity space, the height space and the distance space are respectively assigned to one of RGB value spaces for each point.

14. The processing method of claim 4, wherein the 3D point cloud is derived using the depth sensor such as a Lidar.

15. The processing method of claim 4, wherein each of the intensity space, the height space and the distance space are respectively assigned to one of RGB value spaces for each point.

16. A method for classification of an object of interest within a 3D point cloud, comprising:
    the processing method according to claim 1;
    supplying at least one single multi-channel 2D space based on the at least three two-dimensional (2D) spaces to a machine learning such as a deep neural network; and
    outputting at least one classification label for each single multi-channel 2D space based on the at least three two-dimensional (2D) spaces supplied identifying at least one object of interest within the 3D point cloud.

17. The classification method of claim 16, wherein the machine learning comprises a training phase during which the supplying step includes:
    accumulating a batch of multi-channel 2D spaces by repeating the processing method according to claim 1; and
    supplying an average combination of a random number of multi-channel 2D spaces among said batch of accumulated multi-channel 2D spaces.

18. The classification method of claim 16, wherein the machine learning comprises a training phase during which the supplying step includes:
    accumulating a batch of multi-channel 2D spaces by repeating the processing method according to claim 1; and
    supplying several multi-channel 2D spaces distributed in a predefined order among said batch of accumulated multi-channel 2D spaces.

19. The classification method of claim 16, wherein the machine learning comprises a training phase during which the supplying step includes:
    accumulating a batch of multi-channel 2D spaces by repeating the processing method according to claim 1; and
    supplying a matrix of at least 2×2 multi-channel 2D spaces randomly selected among said batch of accumulated multi-channel 2D spaces.

20. A vehicle, comprising:
    a depth sensor configured to obtain 3D point clouds of a followed path when the vehicle is driven at least from a driver's point of view, a processor to process the obtained 3D point clouds that is configured to operate according to the processing method of claim 1;
a classifying unit to classify an object of interest within processed 3D point clouds;
a display configured to display an information related to the classified object of interest;
an autonomous driving unit configured to control the vehicle depending on the classified object of interest; and
a decision unit to decide to activate at least one of the display unit and the autonomous driving unit.

\* \* \* \* \*